US008144115B2

(12) United States Patent
Konicek

(10) Patent No.: US 8,144,115 B2
(45) Date of Patent: Mar. 27, 2012

(54) FLAT PANEL DISPLAY SCREEN OPERABLE FOR TOUCH POSITION DETERMINATION SYSTEM AND METHODS

(76) Inventor: Jeffrey C. Konicek, Tolono, IL (US)

( * ) Notice: Subject to any disclaimer, the term of this patent is extended or adjusted under 35 U.S.C. 154(b) by 892 days.

(21) Appl. No.: 11/378,205

(22) Filed: Mar. 17, 2006

(65) Prior Publication Data

US 2007/0216657 A1   Sep. 20, 2007

(51) Int. Cl.
*G09G 3/36* (2006.01)
*G06F 3/045* (2006.01)
(52) U.S. Cl. .................................. 345/104; 345/174
(58) Field of Classification Search .................. None
See application file for complete search history.

(56) References Cited

U.S. PATENT DOCUMENTS

| | | | |
|---|---|---|---|
| 3,668,313 A * | 6/1972 | Dym | 178/18.05 |
| 4,224,615 A | 9/1980 | Penz | |
| 4,319,237 A * | 3/1982 | Matsuo et al. | 345/101 |
| 4,363,029 A * | 12/1982 | Piliavin et al. | 340/501 |
| 4,476,463 A * | 10/1984 | Ng et al. | 345/174 |
| 4,707,845 A * | 11/1987 | Krein et al. | 178/20.01 |
| 4,733,222 A * | 3/1988 | Evans | 341/33 |
| 4,834,510 A * | 5/1989 | Fujita | 345/97 |
| 4,841,290 A | 6/1989 | Nakano et al. | |
| 4,853,498 A | 8/1989 | Meadows et al. | |
| 4,922,061 A | 5/1990 | Meadows et al. | |
| 4,972,252 A | 11/1990 | Maekawa | |
| 5,043,710 A | 8/1991 | Rydel | |
| 5,124,695 A | 6/1992 | Green | |
| 5,194,862 A | 3/1993 | Edwards | |
| 5,204,659 A | 4/1993 | Sarma | |
| 5,331,149 A | 7/1994 | Spitzer | |
| 5,446,564 A | 8/1995 | Mawatari et al. | |
| 5,598,474 A | 1/1997 | Johnson | |
| 5,708,460 A | 1/1998 | Young et al. | |
| 5,717,321 A | 2/1998 | Kerth et al. | |
| 5,751,276 A | 5/1998 | Shih | |
| 5,777,596 A * | 7/1998 | Herbert | 345/104 |
| 5,861,583 A * | 1/1999 | Schediwy et al. | 178/18.06 |
| 5,886,687 A * | 3/1999 | Gibson | 345/173 |

(Continued)

FOREIGN PATENT DOCUMENTS

EP     0942583     9/1999

(Continued)

OTHER PUBLICATIONS

Chenson Chen, et al., "Ultraviolet, Visible, and Infared Response of PtSi Schotty Barrier Detectors Operated in the Front- Illuminated Mode", IEEE Transaction on Electron Devices, vol. 38, No. 5, pp. 1094-1109 (May 1991).

(Continued)

*Primary Examiner* — Amare Mengistu
*Assistant Examiner* — Antonio Xavier
(74) *Attorney, Agent, or Firm* — Steven G. Lisa, Ltd.; James David Busch; Mildred E. Park

(57) ABSTRACT

A system and method are disclosed that determines the location of an object touching a display screen. The system and method modifies already existing display technology, including using the underlying structure of many types of existing displays as the touch detecting structure. The systems and methods are applicable to virtually all LCD and LCD-like displays, including emissive displays (OLED, PLED, quantum dot displays, etc.), electronic paper, and others.

12 Claims, 8 Drawing Sheets

U.S. PATENT DOCUMENTS

| | | | |
|---|---|---|---|
| 5,929,845 A | 7/1999 | Wei et al. | |
| 5,933,202 A * | 8/1999 | Watanabe et al. | 349/33 |
| 6,016,140 A | 1/2000 | Blouin et al. | |
| 6,028,581 A | 2/2000 | Umeya | |
| 6,040,810 A | 3/2000 | Nisimura | |
| 6,115,017 A | 9/2000 | Mikami et al. | |
| 6,133,906 A * | 10/2000 | Geaghan | 345/179 |
| 6,144,165 A | 11/2000 | Lindenbaum | |
| 6,163,313 A | 12/2000 | Aroyan et al. | |
| 6,172,667 B1 | 1/2001 | Sayag | |
| 6,204,897 B1 | 3/2001 | Colgan et al. | |
| 6,239,788 B1 * | 5/2001 | Nohno et al. | 345/173 |
| 6,246,394 B1 | 6/2001 | Kalthoff et al. | |
| 6,369,685 B1 | 4/2002 | Milavec et al. | |
| 6,372,534 B1 | 4/2002 | den Boer et al. | |
| 6,400,359 B1 * | 6/2002 | Katabami | 345/173 |
| 6,404,137 B1 | 6/2002 | Shodo | |
| 6,411,344 B2 | 6/2002 | Fujii et al. | |
| 6,424,094 B1 | 7/2002 | Feldman | |
| 6,480,305 B1 | 11/2002 | Resman | |
| 6,489,619 B2 * | 12/2002 | Street | 250/370.09 |
| 6,506,983 B1 | 1/2003 | Babb et al. | |
| 6,512,512 B1 | 1/2003 | Blanchard | |
| 6,559,433 B1 | 5/2003 | Ozawa | |
| 6,559,835 B1 | 5/2003 | Randall | |
| 6,611,241 B1 | 8/2003 | Firester et al. | |
| 6,624,835 B2 | 9/2003 | Willig | |
| 6,741,237 B1 | 5/2004 | Benard et al. | |
| 6,781,579 B2 | 8/2004 | Huang et al. | |
| 6,819,311 B2 | 11/2004 | Nose et al. | |
| 6,819,316 B2 | 11/2004 | Schulz et al. | |
| 6,825,833 B2 | 11/2004 | Mulligan et al. | |
| 6,831,710 B2 | 12/2004 | den Boer | |
| 6,841,225 B2 | 1/2005 | Bottari | |
| 6,841,642 B2 | 1/2005 | Kaszas | |
| 6,873,308 B2 | 3/2005 | Sagano et al. | |
| 6,885,157 B1 | 4/2005 | Cok et al. | |
| 6,930,658 B2 | 8/2005 | Lee | |
| 6,947,102 B2 | 9/2005 | den Boer et al. | |
| 6,956,553 B2 | 10/2005 | Tsutsui et al. | |
| 6,956,632 B2 | 10/2005 | Ozawa et al. | |
| 6,961,015 B2 | 11/2005 | Kernahan et al. | |
| 6,961,104 B2 | 11/2005 | Baek | |
| 6,977,646 B1 | 12/2005 | Hauck et al. | |
| 6,992,317 B2 | 1/2006 | Jain et al. | |
| 7,009,663 B2 | 3/2006 | Ablicah et al. | |
| 7,030,551 B2 | 4/2006 | Yamazaki et al. | |
| 7,042,548 B2 | 5/2006 | Zhang | |
| 7,259,754 B2 | 8/2007 | Sasaki et al. | |
| 7,453,217 B2 | 11/2008 | Lys et al. | |
| 7,466,348 B2 | 12/2008 | Morikawa et al. | |
| 7,714,846 B1 * | 5/2010 | Gray | 345/173 |
| 2001/0043166 A1 | 11/2001 | Jacobosen et al. | |
| 2003/0007135 A1 | 1/2003 | Sciammarella et al. | |
| 2003/0030654 A1 | 2/2003 | Sagano et al. | |
| 2003/0060683 A1 * | 3/2003 | Abe et al. | 600/180 |
| 2003/0067447 A1 * | 4/2003 | Geaghan et al. | 345/173 |
| 2003/0095109 A1 | 5/2003 | Sasaki et al. | |
| 2003/0122749 A1 | 7/2003 | Booth et al. | |
| 2004/0095360 A1 | 5/2004 | Tseng et al. | |
| 2004/0095617 A1 | 5/2004 | Mangerson | |
| 2004/0140964 A1 | 7/2004 | Wang et al. | |
| 2004/0140993 A1 * | 7/2004 | Geaghan et al. | 345/702 |
| 2004/0153649 A1 | 8/2004 | Rhoads et al. | |
| 2004/0155991 A1 * | 8/2004 | Lowles et al. | 349/12 |
| 2004/0227743 A1 * | 11/2004 | Brown | 345/204 |
| 2004/0232239 A1 | 11/2004 | Tseng | |
| 2004/0263701 A1 * | 12/2004 | Ukigaya | 349/36 |
| 2005/0006656 A1 | 1/2005 | Jain et al. | |
| 2005/0007361 A1 * | 1/2005 | Fujikura et al. | 345/204 |
| 2005/0199876 A1 | 9/2005 | Matsumoto | |
| 2005/0231656 A1 | 10/2005 | den Boer et al. | |
| 2006/0007222 A1 | 1/2006 | Uy | |
| 2006/0012575 A1 * | 1/2006 | Knapp et al. | 345/173 |
| 2006/0081706 A1 | 4/2006 | Onischuk | |
| 2006/0262100 A1 * | 11/2006 | Van Berkel | 345/173 |
| 2007/0062739 A1 * | 3/2007 | Philipp et al. | 178/18.06 |
| 2007/0085157 A1 | 4/2007 | Fadell et al. | |
| 2009/0320106 A1 | 12/2009 | Jones et al. | |

FOREIGN PATENT DOCUMENTS

| | | | |
|---|---|---|---|
| EP | 0942583 A1 | 9/1999 | |
| JP | 10090655 | 4/1998 | |
| JP | 10090655 A | 4/1998 | |
| WO | WO2006004981 | 1/2006 | |
| WO | WO-2006004981 B1 | 1/2006 | |

OTHER PUBLICATIONS

Axel Richter, et al., "Current-Induced Light Emission from a Porous Silicon Device", IEEE Electron Device Letters, vol. 12, No. 12, pp. 691-692 (Dec. 1991).

Bleha, W.P., et al, "Application of the Liquid Crystal Light Valve to Real-Time Optical Processing", Optical Engineering, Jul.-Aug. 78/ vol. 17, No. 4.

Toshiba Unveils Sophisticated New Display Technologies for Mobile Computing, Cellphone and Industrial Markets, May 25, 2004 (URL:http:/ / www.toshiba.com/ taec/ news/ press_releases/ 2004 /lcdb_04_213.jsp).

Toshiba Debuts First Full-Color "System on Glass" (SOG) Input Display With Image Capture Technology, May 26, 2004.

Yeh and Gu, "Optics of Liquid Crystal Displays," Wiley-Interscience (Sep. 1999).

MacDonald and Lowe, "Display Systems: Design and Applications," John Wiley and Sons (Jun. 1997).

MacDonald an Lowe, "Display Systems: Design and Applications," John Wiley and Sons, Jun. 1997.

Boer and Newnes, "Active Matrix Liquid Crystal Displays: Fundamentals and Applications," Sep. 2005.

Tsukada, "TFT/LCD Liquid Crystal Displays Addressed by Thin-Film Transistors," CRC Press, Jun. 1996.

Fink, "Electronics Engineers' Handbook," McGraw-Hill, 1975.

Jurgen and Fink, "Electronics Engineers' Handbook," Christiansen, McGraw-Hill Professional, 1996.

Chang, "Field and Wave Electromagnetics," Prentice Hall, 1989.

Osgood, Ong and Downs, "Touch Screen Controller Tips," Burr-Brown Application Bulletin.

Liu et al., A high Speed Finger-Print Optical Scanning Method, Optical Storage and Optical Information Processing (2000).

Boer and Newnes, Active Matrix Liquid Crystal Displays: Fundamentals and Applications (2005).

Bleha, W.P., et al., Application of the Liquid Crystal Light Valve to Real-Time Optical Processing, Optical Engineering, Jul.-Aug. 78/ vol. 17, No. 4. (1978).

Ratha et al., Automatic Fingerprint Recognition Systems, Springer (2003).

Bhanu et al., Computational Algorithms for Fingerprint Recognition, Springer (2003).

Axel Richter, et al., Current-Induced Light Emission from a Porous Silicon Device, IEEE Electron Device Letters, vol. 12, No. 12, pp. 691-692 (Dec. 1991).

MacDonald and Lowe, Display Systems: Design and Applications, John Wiley and Sons, Jun. 1997.

Jurgen and Fink, Electronics Engineers' Handbook, Christiansen, McGraw-Hill Professional, 1996.

Fink, Electronics Engineers' Handbook, McGraw-Hill, 1975.

Chang, Field and Wave Electromagnetics, Prentice Hall, 1989.

Malhorta, Handbook of Polymers in Electronics, Rapra Technology Ltd (2002).

Jain, Intellighet Biometric Techniques in Fingerprint and Face Recognition, CRC (1999).

Yeh and Gu, Optics of Liquid Crystal Displays, Wiley-Interscience (Sep. 1999).

Shinar, Organic Light-Emitting Devices, Springer (2003).

Kalinowski, Organic Light-Emitting Diodes: Principles, Characteristics and Processes, CRC (2004).

Brabec, Organic Photovoltaics: Concepts and Realizations, Springer (2003).

Patent Abstracts of Japan vol. 18 No. 439 (P-1787); JP, A,06 138437 (Pioneer) May 20, 1994.

Patent Abstracts of Japan vol. 1996, No. 02, Feb. 29, 1996.
Patent Abstracts of Japan vol. 1998, No. 08, Jun. 30, 1998.
Patent Abstracts of Japan vol. 1998, No. 09, Jul. 31, 1998.
Joyce et al, Quantum Dots: Fundamentals, Applications, and Frontiers, Springer (2005).
Toshiba Debuts First Full-Color 'System on Glass' (SOG) Input Display With Image Capture Technology, May 26, 2004.
Toshiba Unveils Sophisticated New Display Technologies for Mobile Computing, Cellphone and Industrial Markets, May 25, 2004 (URL: http://www.toshiba.com/taec/news/press_releases/2004/lcdb_04_213.jsp) (2004).
Osgood, Ong and Downs, Touch Screen Controller Tips, Burr-Brown Application Bulletin (2000).
Tuskada, TFT/LCD Liquid Crystal Displays Addressed by Thin-Film Transistors, CRC Press, Jun. 1996.

Chenson Chen, et al., Ultraviolet, Visible, and Infared Response of PtSi Schotty-Barrier Detectors Operated in the Front- Illuminated Mode, IEEE Transactions on Electron Devices, vol. 38, No. 5, pp. 1094-1109 (May 1991).
WO2006004981—International Preliminary Report on Patentability (1900).
Non-Final Office Action Dated Feb. 24, 2010 in U.S. Appl. No. 11/796,343.
Applicant's Response to Non-Final Office Action Dated Jul. 23, 2010 in U.S. Appl. No. 11/796,343.
Non-Final Office Action Dated Feb. 24, 2010 in U.S. Appl. No. 12/947,110.

* cited by examiner

Frequency of AC sources 1004 and 1006 is greater than the optical response rate of the pixels.

FLAT PANEL DISPLAY SCREEN OPERABLE FOR TOUCH POSITION DETERMINATION SYSTEM AND METHODS

BACKGROUND OF THE INVENTION

1) Field of the Invention

The present invention relates to touch screen technology and, more particularly, to a system and method that provides touch sensitivity to existing display panel technology while requiring fewer manufacturing steps, utilizing much of the existing display structure and resulting in reduced cost and a thinner overall panel assembly compared to existing touch sensitive display panels.

2) Description of the Art

Modem LCD display technology is well known in the art. Briefly, Liquid Crystal Display (LCD) technology uses two clear panels which orthogonally polarize light. Sandwiched between the panels is a layer of liquid crystal material which can change the polarized direction of light. In quiescent state, and assuming twist nematic (TN) liquid crystal, the panel appears clear since the relaxed liquid crystal twists the polarization vector of the light from one polarized panel through 90 degrees to match the other polarized panel. When an electric field is applied to the liquid crystal layer, the polarization twist imparted by the liquid crystal layer is made correspondingly less (as the field strength increases). Thus less light passes through the panel and the intensity of the passing light is governed by the completeness of the twist of the polarizing vector of the light through the liquid crystal material layer (which is inversely proportional to the electric field applied to the liquid crystal). Modern LCD displays use this phenomenon at the pixel level for each of the primary colors, red, green and blue. By closely controlling the electric field applied to the liquid crystal, the amount of 'twist' given to the polarized light as it passes through the liquid crystal can be tightly controlled. Thus, the intensity (transmissibility) of the red, green, and blue light for each pixel can be tightly governed. To the viewer, this gives the illusion that a pixel takes on any of myriad colors. For information on typical LCD display systems, see the following, each of which is incorporated herein by reference: "Optics of Liquid Crystal Displays," Yeh and Gu, Wiley-Interscience (September 1999); "Display Systems: Design and Applications," MacDonald and Lowe, John Wiley and Sons (June 1997).

There are several available architectures known for creating and manufacturing the pixels for display panel technologies. Of these, they can be generalized into one of two major categories: one is passive array technology and the other is active array or active matrix technology. An example of typical passive array technology LCD is shown in FIG. 8 (this is also the typical passive architecture for electronic paper, such as that sold under the Sony trademarks "Sony Reader" and "LIBRIe", which does not require the polarizing plates). A first clear panel 802 polarizes light in one direction. A second clear panel 804 has disposed on it a number of clear electrical conductors (typically ITO) 812, arranged in a grid fashion and having traces running to the periphery of the panel. A third panel 806 is typically an encapsulated nematic liquid crystal layer, which is followed by another panel 808 that is covered with a clear conductive material forming (this may be opaque for electronic paper) a common electrical plane. The last panel 810 in the FIG. 8 acts to polarizes light orthogonally to the first panel 802. Pixel conductors 812 along with the common electrical plane 808 form a plurality of pixel plate capacitors with the liquid crystal layer being the dielectric of each.

Light passing through panel 802 is polarized in a given direction (i.e., filtered to be polarized). The polarized light continues on and passes through panels 804 and at 806, where the polarized light is 'twisted' by the liquid crystal layer so that when it emerges from the other side, it is polarized orthogonally to that when it passed through the first panel. The light continues through panels 808 and 810, since it is now polarized in the direction of polarization of panel 810. Thus, the panel appears relatively clear. Upon application of a charge (relative to panel 808) to any of the pixels 812, the underlying liquid crystal layer will 'twist' the light less than it did in its relaxed state. Thus, these pixels appear darker owing to less light transmission through them. As the pixel charge (i.e., electric field strength) is increased, the liquid crystal between the charged pixel 812 and the common electrical plane twists the light less and less until the light is blocked from passing through the panels. In this way, the transmissibility of the panel is electrically controllable.

FIG. 9 shows another common passive matrix array typically used for OLED, PLED, etc. In this architecture, there are a first plurality of conductors 902 oriented orthogonally to a second plurality of conductors 904. Sandwiched between the first and second sets of conductors is an emissive material layer 906 (shown as an entire layer in the figure, but it may also be disposed only at conductor overlapping points if desired). Typically, at least one of the sets of conductors is transparent. A potential difference is applied to at least one of conductors 902 and 904, causing a current to flow through the emissive material layer at the point of overlap between the conductors having the potential difference. This then causes the emissive material to illuminate. For information on quantum dot displays technology, see the following references, incorporated herein by reference: U.S. Pat. No. 6,992,317, U.S. Application 20050006656, and "Optics of Quantum Dots and Wires," by Garnett W. Bryant (Editor), Glenn S. Solomon (Editor), Artech House Solid State Technology Library (2004).

Passive arrays are typically used for very small arrays. This is because for the array of FIG. 8, each pixel typically has a connection to the periphery of the panel, and this grows exponentially with the number of pixels. The array of FIG. 9 is essentially a multiplexed array wherein each pixel is illuminated for only that time that it is electrically stimulated. Since each pixel typically shares connections with many other pixels, they must each be stimulated in time-multiplexed fashion and rely on eye persistence to produce a smooth image. This tends to produce a dimmer image than could be obtain by each pixel being illuminated for the duration of the display time.

Therefore, current preference in the art is to use active matrix display technology owing to it being generally brighter and requiring fewer (compared to a passive array having the same number of pixels) external connections for some implementations. Active matrix LCD technology uses thin film transistor technology, or TFT as it is known in the art, for selectively coupling driver circuitry to each pixel capacitor in the LCD array. Using a grey scale LCD panel for illustration only, and referring to FIG. 1, in this technology, a first clear panel (a substrate panel) has a number of transparent conductor electrodes 10 applied to the clear panel in a grid arrangement with each electrode corresponding to a pixel. Each of these electrodes forms one tiny plate of a capacitor corresponding to each pixel (i.e., a pixel plate capacitor), and each of these plates is connected to the source of an associated small thin-film transistor 16, which is also on the clear panel (i.e., the substrate panel). In another construction technique, the electrodes are formed of an opaque material with the center cut out to allow light to transmit through, however, transparent electrodes admit more light as a whole. In yet another construction technique, the pixel is subdivided as described above with each subpixel having its own TFT transistor.

To increase the charge storing capacity of the pixel, capacitor 18 is typically placed in parallel with the pixel plate capacitor formed by plate 10 and a transparent common electrical plane (not shown). Running through the matrix of electrodes and capacitors is an X-Y grid of conductors, 12 and 14, with one direction connected to the drain of each transistor in a row and the orthogonally-running conductors connecting to the gate of each transistor in a column. Thus, each pixel can be manipulated by proper coordination of signals on the X-Y grid of conductors.

For more detailed information on active matrix LCD techniques see the following references, incorporated herein by reference: "Optics of Liquid Crystal Displays," Yeh and Gu, Wiley-Interscience, September 1999; "Display Systems: Design and Applications," MacDonald an Lowe, John Wiley and Sons, June 1997; "Active Matrix Liquid Crystal Displays: Fundamentals and Applications," Boer, Newnes, September 2005; "TFT/LCD Liquid Crystal Displays addressed by Thin-Film Transistors," Tsukada, CRC Press, June 1996; U.S. Pat. No. 6,372,534; U.S. Pat. No. 6,956,632; U.S. Pat. No. 6,819,311; U.S. Pat. No. 6,115,017; U.S. Pat. No. 5,204,659.

The panel having the pixel plates, TFT transistors and X-Y conductors as described above (i.e., the substrate panel) is coupled to a film or panel which is designed to polarize light in a certain direction (or the substrate layer itself may perform this function. A second clear panel (not shown) is designed to polarize light in an orthogonal direction to the first panel. This second panel is also covered with a clear electrode which typically forms the common electrical plane, and is the other plate for all pixel capacitors (the first plates of which are on the substrate panel). Sandwiched between the first and second panels is a thin liquid crystal layer, which is responsive to the charge on each pixel capacitor thus formed and is the dielectric material for each pixel capacitor. This liquid crystal layer performs the twisting of the polarizing vector of the light which passes through it. The amount of polarization twist imparted to passing light for each pixel location is inversely proportional to the charge in each pixel plate capacitor (i.e., the electric field strength) (which may be augmented by the additional auxiliary capacitor as described above) which is applied to the liquid crystal material forming the dielectric layer of the pixel capacitors as described previously.

To extend the above description to color, the number of pixels is trebled to achieve the same resolution (as a corresponding grey scale panel) and each pixel is associated with red, green or blue light (usually by a filtering structure or layer). In this way, 3 pixels, one each of red green and blue are perceptively combined to form an image pixel of the rendered image in full color.

Other types of liquid crystal displays are known in the art including IPS (in-plane switching) and VA (vertical alignment). These have found favor recently in that they allow wider viewing angles than TN (twist nematic). The basic principles of operation of these types are known and will not be reviewed here.

Owing to the fact that the pixel capacitor charges will dissipate with time and that the image on the display may change from time to time, the pixel capacitors are refreshed from time to time with new values/data. Typical refresh rate for LCD technology is about 60 times a second for the whole of the display.

While typical LCD technology stores an analog value of charge on the pixel capacitor plate corresponding to the desired brightness of the pixel (i.e., an analog value), a pixel design has recently been developed where the total area of the pixel is subdivided into subpixels. For example, see FIG. 4, which does not show the auxiliary storage capacitors. These subpixels are in the ratio of half, quarter, eighth, sixteen, etc. (40*a*, 40*b*, 40*c*, 40*d*) of the total pixel area, 40. In this way, appropriate combinations of subpixels can simply be turned on and off to achieve the desired brightness of the overall pixel. The advantage is that now the subpixels need only have two states, full on and full off. The modulation of the overall pixel brightness is achieved by proper selection of the subpixels to turn on. This is accomplished via bus 48 and transistors 44. With this technique, each pixel essentially stores a digital value for its brightness and the effects of voltage droop on the pixel plates between refresh cycles are reduced since the subpixel capacitors are slightly overcharged (e.g., driven beyond subpixel saturation). Saturation in this context generally means that the pixel is at minimum transmissibility, and an increase in pixel capacitor voltage will not further decrease the transmissibility of the pixel. For more information on this display architecture see the following references, each of which is herein incorporated by reference: U.S. Pat. No. 6,956,553, U.S. Pat. No. 5,124,695.

Some implementations of display panels using existing LCD technology also incorporate touch screen technology which allows a user to indicate a position on a screen by simply touching the screen with his finger or a stylus and having the point of contact sensed and translated by electronics to an indication of position. Essentially, the technology turns the screen into a mouse pad for such things as tablet PCs, personal digital assistants, cell phones, etc. There are several forms of the technology which are basically add-on systems to standard LCD technology to make the screen touch sensitive.

In resistive touch screen technology, a resistive/conductive film (usual two layers) is applied to the surface of the LCD and the film(s) is flooded by associated electronics with a relatively constant current. When contact is made with the film, disruption in the current flows within the film is detected by associated electronics which quickly pinpoints the area of the disruption. Thus, the information can be used to determine the location on the screen to which the user is touching. For examples of resistive touch screen systems, see the following references, each of which is incorporated herein by reference: U.S. Pat. No. 6,841,642; U.S. Pat. No. 6,781,579; U.S. Pat. No. 6,424,094; U.S. Pat. No. 6,246,394; U.S. Pat. No. 6,624,835; U.S. Pat. No. 6,204,897; U.S. Pat. No. 6,559,835; U.S. Pat. No. 6,163,313.

Similarly, in capacitive touch screen technology, a film is applied to the LCD and is flooded with a uniform charge by associated electronics. When touched, the charge is disrupted. Associated electronics again sense the disruption and quickly pinpoint the location of the disruption and determine the screen location being touched. For examples of capacitive touch screen systems, see the following references, each of which is incorporated herein by reference: U.S. Pat. No. 6,819,316; U.S. Pat. No. 4,922,061; U.S. Pat. No. 4,853,498; U.S. Pat. No. 4,476,463; U.S. Pat. No. 5,194,862. Another type of capacitive touch screen applies conductors over the surface of the screen and has associated electronics operable for detecting the capacitive coupling between conductors when the finger or other object is in proximity or contact with the screen. For examples of this type of touch screen, see the following references, each of which is incorporated herein by reference: U.S. Pat. No. 6,961,104; U.S. Pat. No. 6,825,833.

Other technologies include RF, optical, surface acoustic wave, infrared, etc. Generally, all these technologies work by flooding the surface of the LCD with some kind of field (current, charge, RF, etc.), detecting disruptions in the field, and determining the position of contact based upon analysis of the disruption(s) in the uniform field or by having sensors disposed on the display which sense a field emitting device, such as an RF generating "pen" (like those used on familiar tablet PCs). Each of these existing technologies can be considered to be "add on" technologies, in that they all require additional manufacturing steps in the creation of the LCD display panel or are technologies applied to the LCD panel after the LCD panel is made. For further examples of these types of touch screen systems and others, see the following references, each of which is incorporated herein by reference: U.S. Pat. No. 6,172,667; U.S. Pat. No. 5,708,460; U.S. Pat. No. 6,411,344; U.S. Pat. No. 6,369,865; U.S. Pat. No. 6,961,015; U.S. Pat. No. 6,741,237; U.S. Pat. No. 6,506,983.

Recently, U.S. Pat. No. 6,885,157 (herein incorporated by reference), purports to describe an integrated touch screen and OLED flat-panel display wherein the OLED display has a plurality of electrical conductors disposed on its surface for touch sensing. See also U.S. Pat. No. 6,841,225. U.S. Pat. No. 6,512,512 (both herein incorporated by reference), which shows a touch sensor where actual contact between layers is detected upon touch contact. U.S. Pat. No. 5,777,596 (herein incorporated by reference) shows an LCD display panel wherein the charge time of pixels is used to give an indication of the pixel capacitance and used to determine touch contact with the display panel. However, measuring the charge imparted to such a small capacitance is cumbersome and susceptible to large measurement errors and may require display pixels to be disabled from their primary purpose (that of display) so that the time required to impart a known amount of charge to the pixel can be determined. A better approach, described more fully below, is to use AC analysis techniques rather than time domain techniques.

Also known in the art is U.S. Pat. No. 4,224,615 (incorporated herein by reference), which compares the impedance of a display element to a reference cell impedance to detect changes in capacitance of the display element when under pressure from touch contact. However, this reference does not teach how the impedance measurement is to be made, or that there is any beneficial time at which the impedance measurement or comparison should be performed, or further, that there is a frequency preferred for the impedance measurement, etc. It is important to bear in mind that at the time of the issuance of U.S. Pat. No. 4,224,615, LCD display images were typically relatively static, being a watch display, calculator display, etc. As is well known, in order to achieve sufficient contrast and to not electrolyze the liquid crystal material, LCD displays typically have the signal polarity applied to the liquid crystal layer reversed from time to time. This is effectively a low frequency AC signal and while it may be used to measure impedances, it is not of sufficiently high frequency to achieve a high sampling rate necessary for position sensing of large modern displays with rapidly changing images.

U.S. Pat. No. 4,363,029 (incorporated herein by reference), describes proximity detection for a display that operates by comparing pixel capacitance variations caused by the proximity of a person's finger to the display with a reference capacitance element incorporated in the device. However, the display element drive is taken to an inactive (non-display) state when sensing and comparing the pixel capacitances to a reference capacitance. U.S. Pat. No. 4,841,290 (incorporated herein by reference), uses an external pen to sense magnetic fields caused by the scanning of the underlying display image and comparing the phase of the sensed fields to that of the scan drivers to determine location of pen contact on the display. This is similar to optically-based position sensing pencils, known in the art, and used with CRT displays wherein the position the pen is contacting the display is determined by a photo sensor in the pencil detecting the minute increase in brightness caused by the pixel being refreshed and this information being coordinated with the display's refresh information. In both cases, an external device is used to perform such sensing.

U.S. Pat. No. 5,043,710 (incorporated herein by reference) uses a high frequency generator and integrator (i.e., filter) to detect changes in the dielectric constant (i.e., the sudden delta of the dielectric constant) of the liquid crystal layer of an LCD when subject to a change in the applied physical pressure such as that created when a finger presses the display screen. Basically, when the high-frequency stimulated liquid crystal layer is compressed, a charge is created (released by the dielectric) which is integrated (i.e., filtered) to give a pulse indication of touch contact. This method is effectual for sensing when a localized change in pressure of the liquid crystal layer occurs and only when a change in pressure occurs (i.e., for sensing a delta in pressure). If the measurement is made too long after the change occurs it can be missed. Additionally, if the object remains in pressure contact with the display screen (i.e., continually touching), its continual contact may not be sensed (owing to there being no 'change' or delta to detect). Another problem with the method is that the high frequency AC is continually applied to the electrode that is common to all display elements and it shares its signal return with the display control circuitry. Thus, there will always be some ac current flowing through all the display elements (capacitors) and into the controller electronics of the display even when not sensing. This can amount to quite a large current always flowing in displays having a large number of pixels or being of large area (and is directly proportional to the frequency of the AC source). This current wastes energy and creates an electrically noisy operating state for the display electronics. In addition, owing to dielectric losses, the dielectric layer (i.e., the liquid crystal) will heat up which could shorten its life significantly.

U.S. Pat. No. 6,133,906 (incorporated herein by reference), uses a pen that generates a signal that is magnetically, capacitively, or directly coupled into the underlying display (i.e., pixel) electrodes, wherein the signal is preferably AC so as to not disrupt the underlying display image and wherein the signal travels along the paths and circuits of the underlying display for detection by associated electronics. However, again, this method uses an external device to generate special fields which are coupled into the electrical connection structures of the display.

Application of a touch sensitive technology and associated electronics to an LCD display, for the purpose of manufacturing a touch sensitive display panel, has in the past involved added cost and steps and increased the thickness of the display panel with applied films or extra panels or conductors (which usually dim the display as well). Additionally, many approaches to adding touch sensitivity known in the art have required the use of specialized external hardware. While many attempts have previously been made to integrate touch-sensing capability within the display, each has, for one reason or another, been left wanting. The need exists for a more complete integration of the touch-sensing capability within the display technology, and further, to make better use of the regular conductor structure and electrical nature and properties of prior art flat panel display technology. The need further exists for better touch detection and position determination techniques when using the display panel's inherent structure and properties while minimizing perturbation to the displayed image.

SUMMARY OF THE INVENTION

It is an object of the invention to provide a cost efficient touch sensitive screen.

It is an object of the invention to provide a touch sensitive screen that can be manufactured with only minor modification to existing display technology.

It is an object of the invention to provide touch sensitive display systems and methods that do not increase the thickness of the display panel.

It is an object of the invention to provide touch sensitive display systems and methods that more completely integrate the touch-sensing capability within the display technology.

It is an object of the invention to provide touch sensitive display systems and methods that make better use of the regular conductor structure of existing flat panel display technology.

It is an object of the invention to integrate touch sensitivity within the display system while only minimally perturbing the displayed image and/or its quality.

It is an object of the invention to integrate touch sensitivity within the display panel while having minimal impact on power consumption.

It is an object of the invention to provide improved systems and methods for enabling touch sensitive features on current display panels with minimal expense and change in design, and that is applicable to a wide variety of flat panel displays including: liquid crystal displays (LCD and LCD-like), organic light-emitting diode displays (OLED), electronic paper, polymer light emitting diode (PLED), and quantum dot displays.

The above and other objects are achieved in a method of determining the approximate location of contact on the surface of a display, wherein the display includes a plurality of pixels at defined pixel locations. The array may be either a linear (one dimensional) array or a two-dimensional (x-y) array. Each pixel location of the array includes a pixel plate capacitor. The systems and method apply a voltage to the pixel plates of the display. The applied voltage has an AC component and the pixel plate capacitors or the parasitic capacitance between neighboring pixels exhibit a detectable capacitance. When an object contacts the display surface, the detectable pixel capacitance (i.e., between plate to ground or between plates of neighboring pixels, either of which is referred to below as "pixel plate capacitance") increases. This increase may be caused in a number of alternative ways, either by physically changing the characteristics of the pixel plate capacitor or by affecting the dielectric constant between adjacent pixel plate capacitors (i.e., increasing the parasitic capacitance between pixel plate capacitors). The applied AC component of the voltage applied to the pixel plate capacitors is monitored to electrically observe the increase in pixel plate capacitance. Depending on the embodiment, any auxiliary pixel capacitor may be decoupled from the pixel circuit using a transistor or other switch, and the monitored AC component can comprise either the phase shift, AC current or the voltage of the AC component or a combination of these (i.e. the impedance for example). The monitored pixel plate capacitance of each pixel plate capacitor (to a common electrode or between pixels, i.e., parasitic capacitance) is compared to a predetermined value associated with an indication that an object is in physical contact with the display surface. The coordinate location of the pixel having a pixel plate capacitance above the predetermined value is then determined.

The above and other objects are also achieved by a system and method that adds touch sensitivity to existing LCD and similar displays with only minor structural modification thereto. For example, according to one aspect of the invention, when the surface of an LCD (or similar) display is touched, the underlying liquid crystal layer is slightly compressed. The pressure of the touch brings the transparent common electrical plane in closer proximity to the pixel plates thus raising the pixel capacitance in the area of compression. This increase in capacitance at the point of contact, when observed, gives an indication of the location of contact. Preferably, during the course of refreshing the screen, or alternatively, at other times desired, each pixel capacitor has its capacitance observed. An observed pixel capacitance higher than a predicted level indicates an area of probable screen depression and a likely area of screen contact by external force such as a finger or stylus. Since the pixels are laid in a tight matrix fashion, the area of screen contact can easily and quickly be determined from knowledge of which pixels are yielding higher observed capacitances.

The above and other objects are achieved in another exemplary embodiment of the invention, in which the capacitive coupling between pixel capacitor plates of neighboring pixels (i.e., the parasitic capacitance between pixels) resulting from touch contact with the display screen is used to determine the location of touch contact with the display screen. This aspect of the invention is presently preferred for display technology that has no compressive layer, such as emissive displays whether based on organic LEDs, polymer LED, Quantum Dot technology, etc.

The preferred embodiments of the invention presented here are described below in the drawing figures and Description of the Drawings. Unless specifically noted, it is intended that the words and phrases in the specification and the claims be given their plain, ordinary and accustomed meaning to those of ordinary skill in the applicable arts. If any other special meaning is intended for any word or phrase, the specification will clearly state and define that special meaning. For example, if a noun or verb is to have a special meaning in a phrase that is different from the ordinary and accustomed meaning, the phrase will always use adjectives or other modifiers for the noun or verb to reflect an intention to narrow the meaning. Thus, absent the use of such specific adjectives or other modifiers, additional unstated limitations should not be construed as being present in the subject phrase.

Likewise, the use of the words "function" or "means" in the Specification or Description of the Drawings is not intended to indicate a desire to invoke the special provisions of 35 U.S.C. 112, Paragraph 6, to define the invention. To the contrary, if the provisions of 35 U.S.C. 112, Paragraph 6 are sought to be invoked to define the inventions, a claim element will specifically state the phrase "means for" or "step for," and will also clearly recite a function, without also reciting in such phrase any structure, material or act in support of the function. Thus, even when a claim element recites a "means for" or "step for" performing a defined function, if the claim element also recites any structure, material or acts in support of that means or step (or that performs the stated function), then the intention is not to invoke the provisions of 35 U.S.C. 112, Paragraph 6. In other words, the inventor is aware of the requirements of 35 U.S.C. 112, Paragraph 6, and will only invoke that section when expressly meeting all of its requirements. Moreover, even if the provisions of 35 U.S.C. 112, Paragraph 6 are invoked to define the claimed inventions, it is intended that the inventions not be limited only to the specific structure, material or acts that are described in the preferred embodiments, but in addition, include any and all structures, materials or acts that perform the claimed function, along with any and all known or later-developed equivalent structures, material or acts for performing the claimed function.

DETAILED DESCRIPTION OF EXEMPLARY PREFERRED EMBODIMENTS

Figure 1:
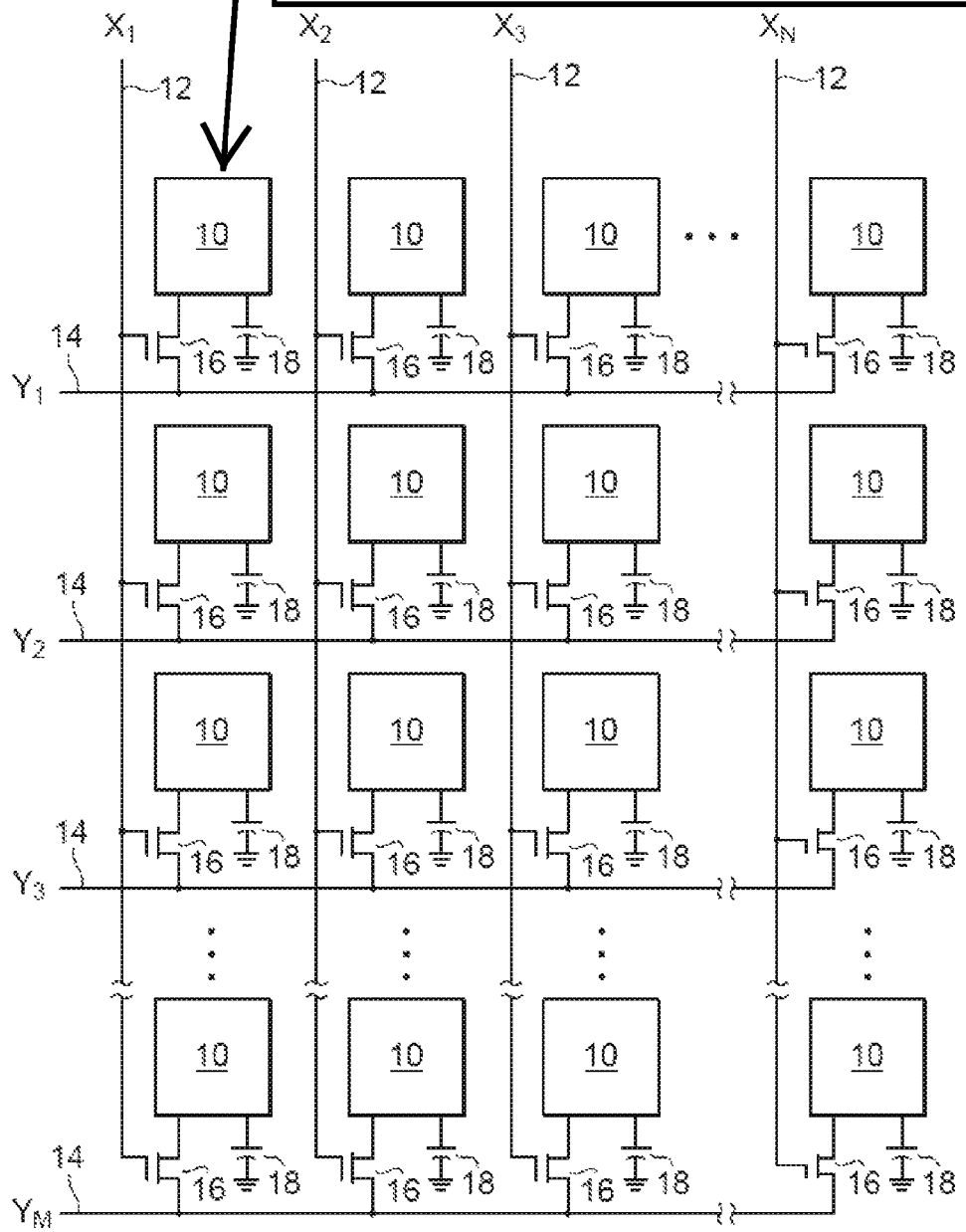
FIG. 1 shows an internal conductor and component design of a typical grey scale TFT LCD display.

In the following description, for the purposes of explanation, numerous specific details are set forth in order to provide a thorough understanding of the various aspects of the present invention. It will be obvious, however, to one skilled in the art that the present invention may be practiced without these specific details. In other instances, well known structures and devices are shown or discussed generally in order to avoid obscuring the present invention or making the specification unnecessarily long. In that regard, in order to further shorten the specification, numerous existing patents and publications are discussed and incorporated by reference above and below. It should be noted that there exist many different display system configurations and technologies to which the present invention may be applied and that, while exemplary preferred embodiments are used to illustrate and explain the various aspects of the invention, application of the various aspect of the invention is not limited to those exemplary preferred embodiments.

In one embodiment of the present invention, during the refreshing of the pixel plate capacitors of the display, the voltage applied to the pixel capacitor also includes an AC component (e.g., small signal component). Preferably, the AC component is of a high frequency readily passed by the capacitance of the pixel to the common electrical plane and preferably of a frequency higher than the optical response frequency of the pixel. When a pixel plate capacitor stores a charge that is less than the pixel's saturation value, it is preferred that the AC component is applied to the pixel for a duration of time which is approximately an integer multiple of the AC component's period. This allows the AC component applied to the pixel to have zero mean (i.e., DC) value over the duration of time it is applied to the pixel capacitance (and thus does not change the desired DC voltage on the pixel capacitor). Alternatively, the AC component is driven for an arbitrary amount of time during the refresh, when its application will not perceptively alter the pixel's luminosity (e.g., a very low level AC in relation to the pixel's DC value, pixel capacitor driven beyond pixel saturation, the AC frequency being sufficiently high that the liquid crystal material can not respond fast enough, etc.) or when it can be allowed to impart a DC offset.

Electronics, preferably coupled to the pixel drive circuitry, are configured and operate to observe the small signal characteristics (e.g., phase shift, amplitude, etc.) of each pixel location as the pixel is having the AC voltage component applied. The observed small signal AC characteristics of the pixel are directly related to the pixel plate capacitance and, thus, give an indication of each pixel's capacitance. In other words, a pixel with an observed capacitance that is different from that predicted in an untouched state informs of (or indicates) the position on the screen of probable screen contact.

Typically, in a state in which there is no contact on the display surface, each pixel's capacitance will be approximately the same and will demonstrate approximately known AC characteristics for a given applied AC amplitude and frequency. However, when physical contact is made with the LCD screen, the transparent common electrical plane will be pushed closer to the pixel capacitor plates disposed on the substrate panel. This, then, results in slightly increased pixel's capacitance at these locations (typically, at a plurality of adjacent pixel locations). By monitoring the capacitance (which is preferably the AC current flow or, alternatively, the observed phase shift of the AC component, impedance, etc.) for each pixel, pixel by pixel, and knowing the location of the monitored pixels, it is possible to determine the area of screen contact.

Figure 5:
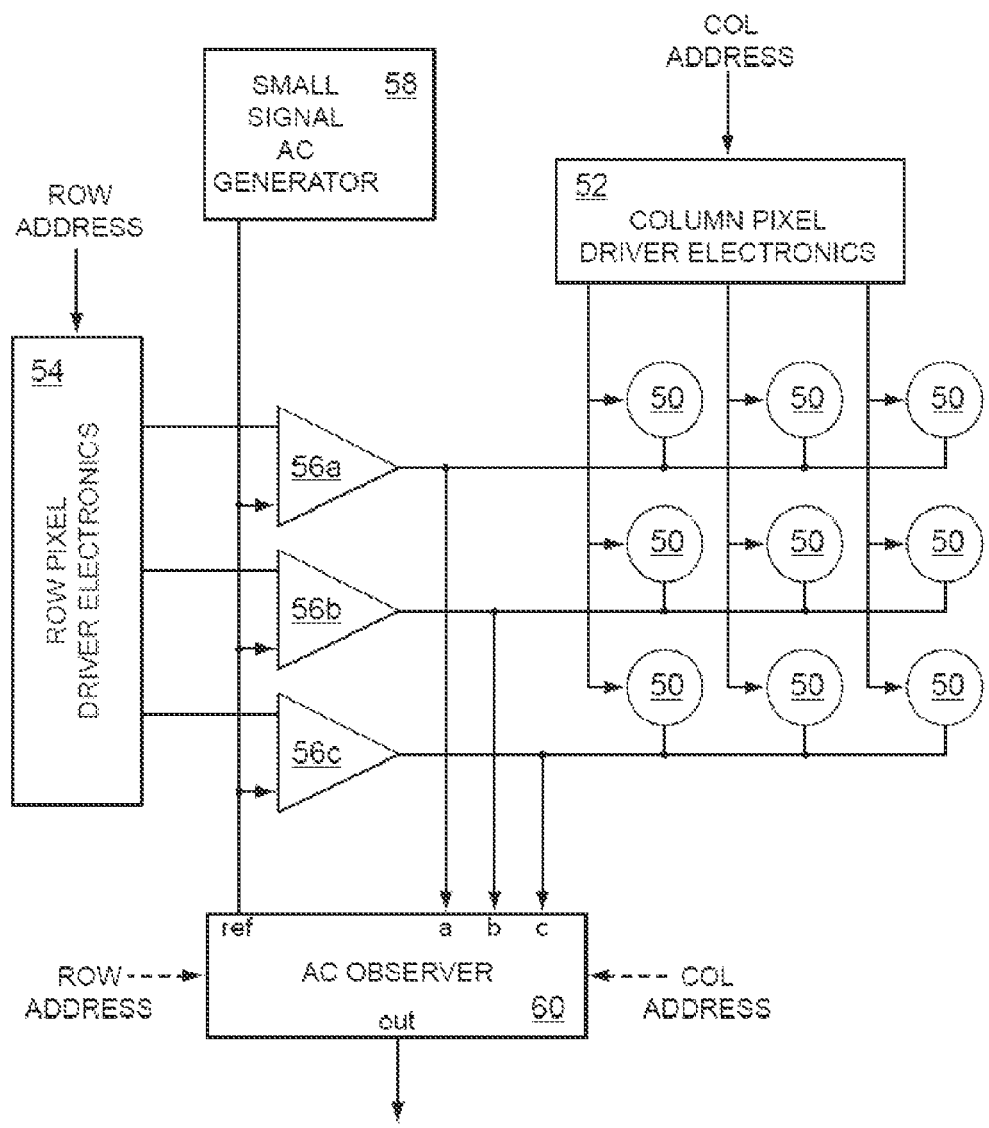
FIG. 5 is a block diagram of a preferred circuit that observes an aspect of the AC signal as applied to display technology.

With reference to FIG. 5, a display screen includes an array of pixels 50, and column and row drive electronics 52 and 54, respectively. Also shown are buffers 56, small signal AC generator 58, and AC observer 60. Buffers 56, can be either summing of the outputs from 54 and 56, or selective of outputs 54 and 56, depending on design choices. AC observer 60 is configured to so that it can monitor the small signal AC signal applied to the pixels and observing their response. AC observer 60 preferably operates to observe any of the AC current flow, the AC phase shift, or the impedance of the pixel, etc. Preferably, when the observed AC characteristics of a pixel are outside a determined range (i.e., ac current flow higher than expected, phase shift more than expected, etc.), the pixel is indicated to be a location of likely screen contact. Preferably, row and column address are also input to AC observer 60, so that the observer 60 can simply output these row and column addresses to indicate the location of contact. However, this is entirely an implementation-specific detail. For instance, AC observer 60 could be configured to simply output an indication of probable contact, and coordination of this indication with display panel scan information could be performed by different circuitry, such as a small processor or dedicated other circuitry.

Figure 2:
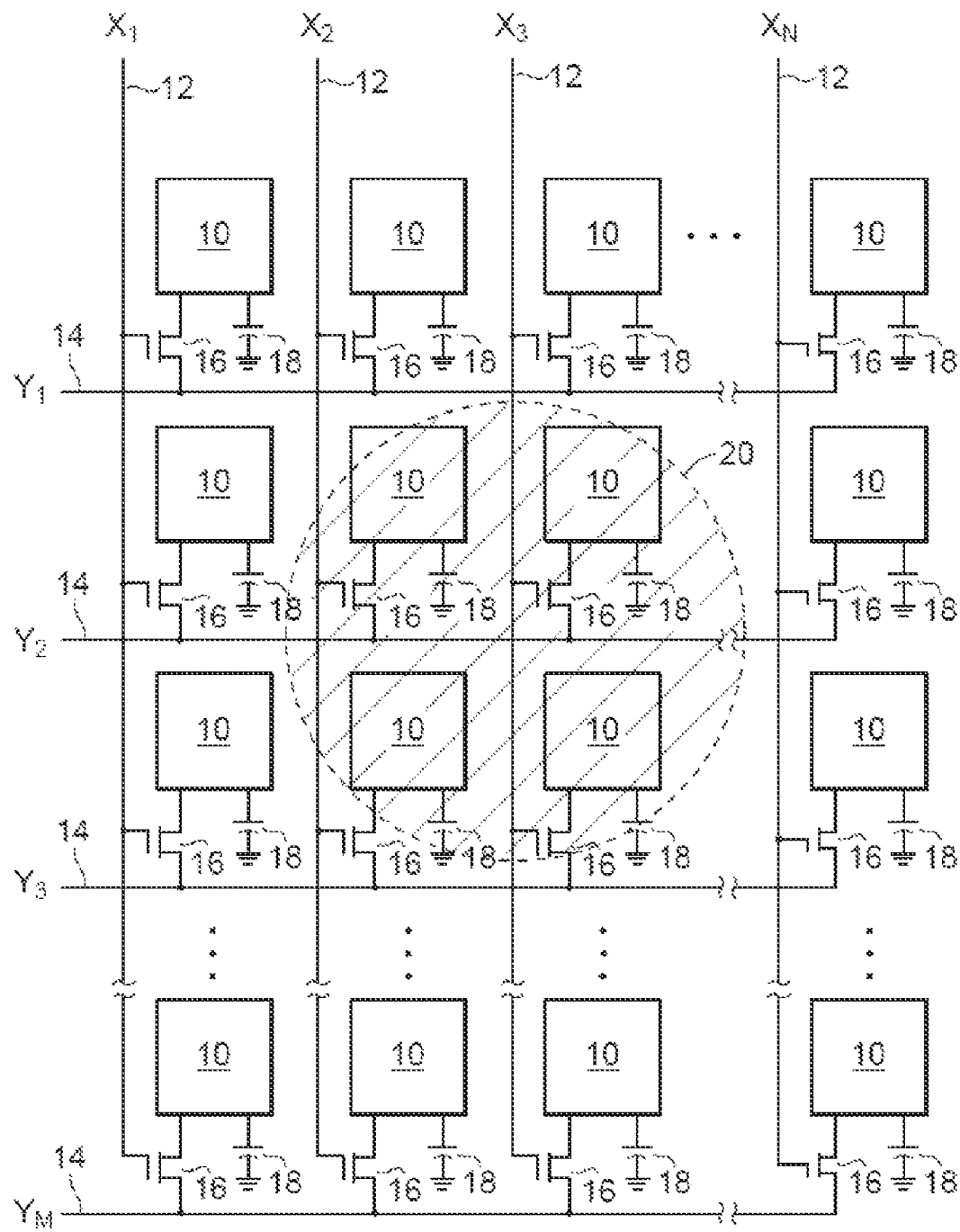
FIG. 2 depicts the same as FIG. 1 with a hypothetical charge coupling device brought in contact with the display surface.

Since a finger or even a stylus point is probably much larger than a pixel, several pixel locations, typically clustered together, will indicate an area of contact (see, e.g., FIG. 2, with area 20 showing an exemplary contact area). The center point of the cluster is preferably determined and is preferably used as the point of actual contact. However, in some cases, determination of the point of maximum capacitance from the observations obtained is preferably used to determine the point of contact. Alternatively, other methods of selecting which point in an area of several contacted pixels is used as the actual point of contact are contemplated, e.g., the capacitance weighted-average location, a point on the edge of the area, average location of pixels with capacitance above a set threshold, etc. In addition, it is contemplated that trajectory analysis techniques can be used to help constrain probable locations of touch contact. Trajectory analysis is known in the electronic art and can be used to determine the likely next point on an approximately continuous curve from knowledge of acceleration, vector direction, curvature of the path thus far, etc. of a object so far. It is known to those skilled in the art to compute any of these factors or others to be used for trajectory analysis, and thus are not discussed further.

The invention is preferably used during the refreshing of the screen with the AC component superimposed on the DC component that is intended to be stored on the pixel capacitors. In this fashion, as the pixels are scanned during refresh, the pixels are also preferably observed to yield an indication of their capacitance by the system and method described. However, the inventive system and methods may also be used standalone, that is, at a time other than pixel refresh. In this case, preferably, the AC component is applied alone, without a DC component, but is still applied in a fashion so as to minimize perturbation of the underlying pixel's display voltage (for example, applying an approximate integer number of cycles, etc.).

The AC component is preferably sinusoidal owing to ease of analysis. However any AC waveform can be applied since all waveforms are comprised of sinusoidal components provided the sinusoidal components are of sufficiently high frequency and magnitude. It is contemplated that the AC component of a changing DC waveform may also be used for the pixel capacitance determination. Thus, as the driven DC waveform which charges the pixel capacitors during refresh changes values in steps, pixel to pixel, the AC components resulting from the steps (recall Fourier) may be used to determine an indication of the pixel capacitance. With this technique, small signal generator 58 of FIG. 5 may be omitted as being unnecessary.

Figure 3:
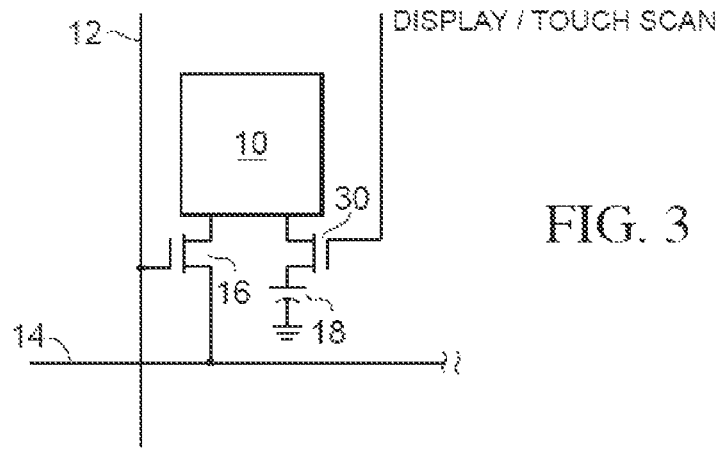
FIG. 3 shows a presently preferred embodiment of one pixel cell as used in the display of the present invention.
Figure 4:
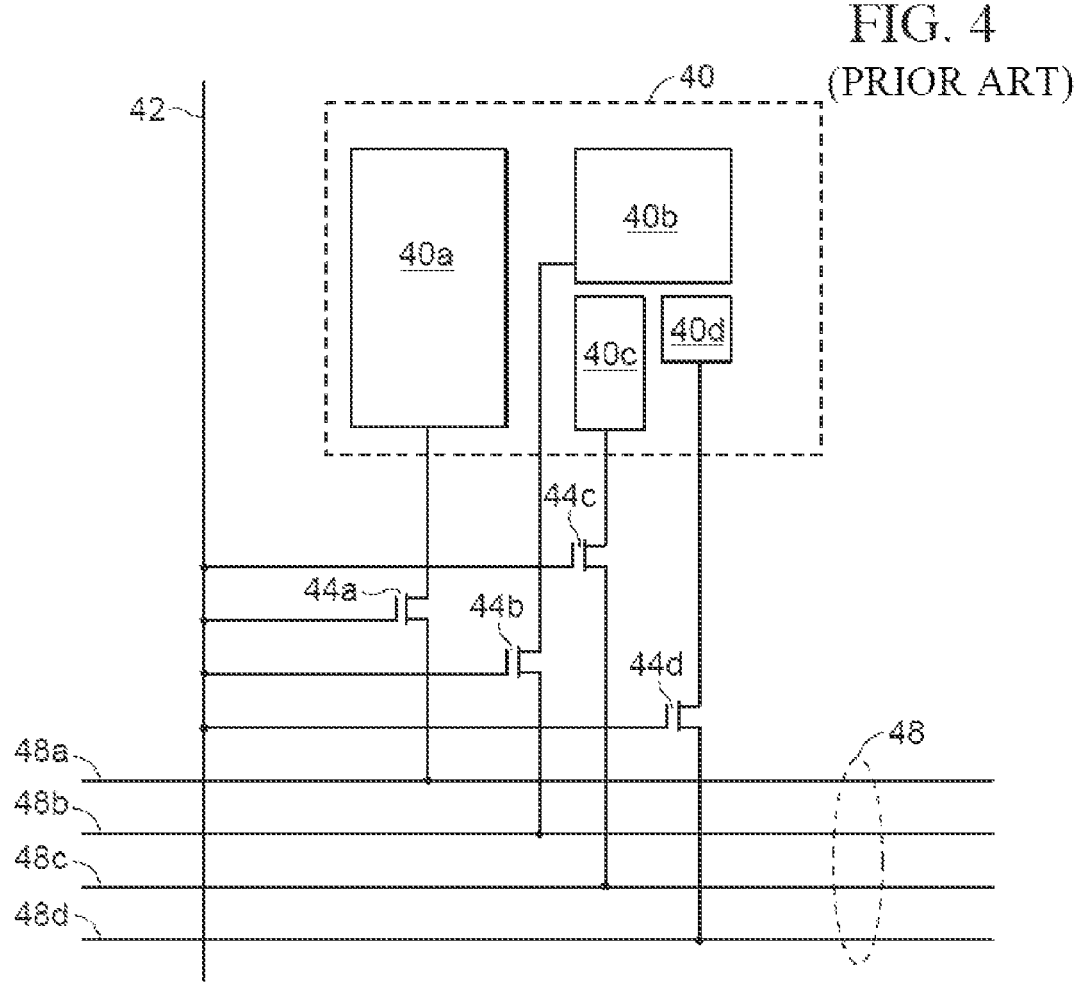
FIG. 4 shows another implementation of existing flat panel display technology.

As described above, many implementations of flat panel display technology will have a capacitor (i.e., an auxiliary capacitor) in parallel with the capacitor formed by the pixel plates in order to stabilize the pixel charge for a longer period of time or to reduce the voltage droop of the pixel between refreshes. According to another aspect of the invention, and with reference to FIG. 3, an additional TFT transistor 30 may be added to the depicted pixel circuit. This transistor is operable for electrically decoupling the stabilizing capacitor 18 (i.e., the auxiliary capacitor) from the pixel's transparent conductor 10. With the stabilizing capacitor 18 decoupled from the pixel plate 10 (i.e., decoupled from the pixel capacitor), the sensitivity of the capacitance detection electronics (i.e., AC observer 60) is increased. Thus, changes in pixel capacitance from the pixel plate 10 to the transparent common electrical plane due to touch contact with the screen can be more easily detected. Furthermore, the decoupling of this capacitor is preferably done for only a portion of the pixel's actual refresh time. Thus, the applied refresh voltage will stabilize the pixel's display state while the auxiliary capacitor is decoupled and the capacitance of the pixel plate capacitor is observed. Preferably, the auxiliary capacitor is then coupled back to the pixel plate capacitor for the remainder of the refresh so that it may be appropriately charged for proper display as well.

If the pixels are scanned for touch contact at a time other than pixel refresh, it is preferred that each pixel plate 10 is decoupled from its capacitor 18 just prior to being scanned and only for enough time to permit observing of the pixel capacitance. This will have virtually no impact on the display image so long as the AC frequency used to observe the pixel plate capacitor is high enough, as described above, and the duration of decoupling is relatively short. Of course, when the capacitor is again coupled to the pixel plate, the pixel will essentially display as before so long as the applied AC signal has imparted no additional DC offset to the pixel plate. As those in the art will appreciate, variations in timing and duration of decoupling between 10 and 18 are design choices. In the alternative, the pixel plate 10 may not be decoupled from the its associated capacitor 18, and in such case, scanning can be done at any time without affecting the displayed image so long as the AC signal adheres to the above described guidelines.

According to another aspect of the invention, an indication of the capacitance between the matrix of pixel capacitor plates 10 neighbor to neighbor (i.e., the parasitic capacitance between pixels) is preferably used to determine panel-touch location. This aspect of the invention has the advantage of not requiring a compressive layer between pixel capacitor plates (though it certainly does not exclude such a layer). With reference to FIG. 2, when an object, such as a finger, stylus, etc. is brought in contact with the panel (shown as area 20 in the figure) that has individual pixel capacitor plates disposed on it, several of the pixel plates 10 will be capacitively coupled together through the object in contact with the panel. By scanning pixel locations for capacitive coupling between neighboring pixel plates, an indication of capacitive coupling, i.e., touch contact, with the panel, is determined. Since the pixel plates are laid out in a well-known pattern, the location of touch contact can be readily determined from knowledge of which pixels are being capacitively coupled to neighboring pixels. This aspect of the invention is well suited to implementations where the transparent common electrical plane is not interposed between the item of contact and the pixel plates. This method is preferred for OLED, PLED, quantum dot, and similar panel technology (emissive displays).

In one embodiment of this form of the invention, each pixel is preferably driven with a small AC waveform which has effectively no DC component (so as to not upset the pixel capacitor's DC charge). At the same time, neighboring pixels are monitored for evidence that some of the AC waveform is coupled to them. Those pixel locations that exhibit higher ac coupling between one another than would typically be expected with no screen contact can be deemed to indicate the presence and location of capacitive coupling from an external source, such as a finger. As with the LCD example embodiments above, it is readily adapted for use during pixel refresh or at other times. In this case, the AC component is preferably superimposed on the DC refresh voltage. Also, it is envisioned that a DC voltage that changes value in steps from pixel to pixel during refresh, since a step-changing type of waveform has an AC component too, may be used to detect capacitive coupling as well.

Additionally, it is contemplated that the previously disclosed aspect of the invention of decoupling the stabilizing capacitor from the pixel can also be applied to this form of the invention, though it is not required. Also, the circuitry of FIG. 5 is readily adapted for use in this aspect of the invention. However, the AC observer 60 would preferably be configured to observe AC coupling between pixels, preferably in the same column as FIG. 5 is rendered. However, it could also be the same row, or any immediately neighboring pixels, and still be within the spirit and scope of the invention. For emissive display technology, neighboring columns are preferably observed for evidence of capacitive coupling, though rows or other neighboring pixels are within the invention's spirit and scope.

If the pixel density of the display is sufficiently great, the invention can be used to scan a person's fingerprint or other similarly variable objects. In the case of a fingerprint, the ridges and valleys of the fingerprint will capacitively couple between neighboring pixels in a slightly different amount, owing to a ridge being closer to a pixel's plate than is a valley. These minute differences in coupling can be observed and used to render a facsimile of the person's finger print. According to this aspect of the invention, neighboring pixels are scanned to detect the fingerprint. Alternatively, a group of pixels may be used to inject an AC signal onto the surface of the finger, and other pixels are observed individually to sense the strength of this AC signal at the pixel location, pixel to pixel. Other objects with similarly variable surfaces can be scanned in the same manner.

As those skilled in the art will appreciate, application and use of the invention is not limited to the exemplary embodiments disclosed above nor to the LCD display technology used herein to illustrate the principles of the invention. Any form of display technology having pixel locations which are connected in a grid-conductor fashion can make use of the invention. For instance, adaptation of the invention to the aforementioned LCD technology using subpixels is straightforward, and use of the pixel parasitic capacitance method is particularly well suited in that the parasitic capacitances between subpixels within a pixel can be observed without involving other pixels. Use of the technology is not confined to active matrix LCD display technology nor limited to TFT display technology. Additionally, the invention is also adaptable for use with OLED (organic LED or organic electroluminescence also known as OEL, ED, etc), PLED display technology or emissive display technology based on quantum dots, electronic paper, etc.

LED based emissive display technology, OLED, PLED, etc., is a relatively new technology offering great promise for reduced-cost flat panel displays as they are simpler to manufacture, using less power and typically being thinner and brighter. OLED technology is an emissive technology, but has similar structure to LCD technology described above. Pixels are formed between electrically conductive plates, which may or may not be buffered by a polymer charge transport material surrounding the emissive layer material, and while the physics and electronics is different than LCD, the electrical connection structures are quite similar in that the pixel emissive layer is bounded by electrical plates. The emissive layer may be composed of organic-based, polymer-based, quantum dot-based, etc., or other materials that emit light when a current flows through them. Typically, light is emitted from these devices through the substrate material. As those skilled in the art will appreciate, these similar electrical structures adapted and operated in accordance with the teachings of this disclosure can be made to service the improvements of the disclosed invention.

Figure 6:
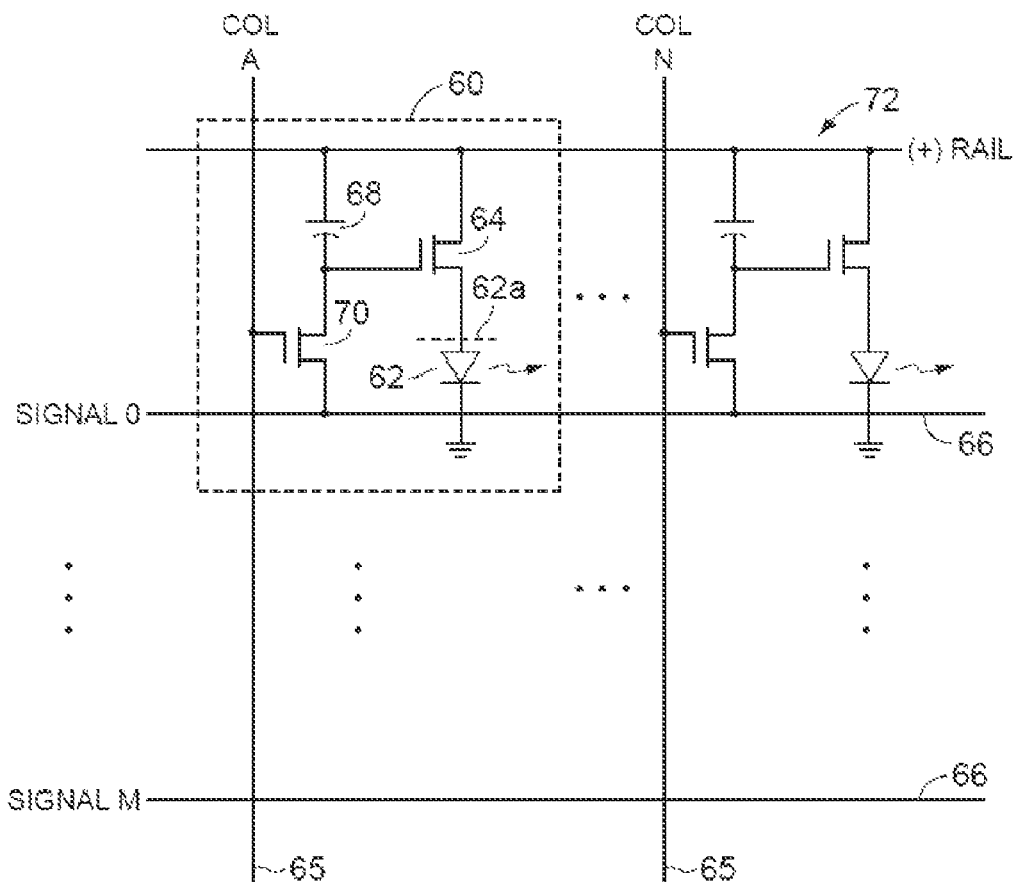
FIG. 6 depicts an example of a typical internal schematic for a few pixels of an emissive display.

FIG. 6 is a typical circuit diagram of pixels 60 in an active matrix (AM) emissive display. LED 62 is ultimately bounded by a common cathode and an anode plate, 62*a*, coupled to transistor 64. Column select lines 65 are enabled one at a time, in coordination with signal lines 66, so that each pixel is addressed and a charge is stored on capacitor 68 (via transistor 70). The charge on capacitor 68 is used to control the desired intensity of the pixel by biasing transistor 64, so that the desired amount of current flows from the positive rail 72 through the LED. While anode plate 62*a* is not strictly a pixel capacitor plate, it does exhibit parasitic capacitance with other plates 62*a* disposed in neighboring pixels, and it is this effect that will be exploited in this embodiment of the invention.

Figure 7:
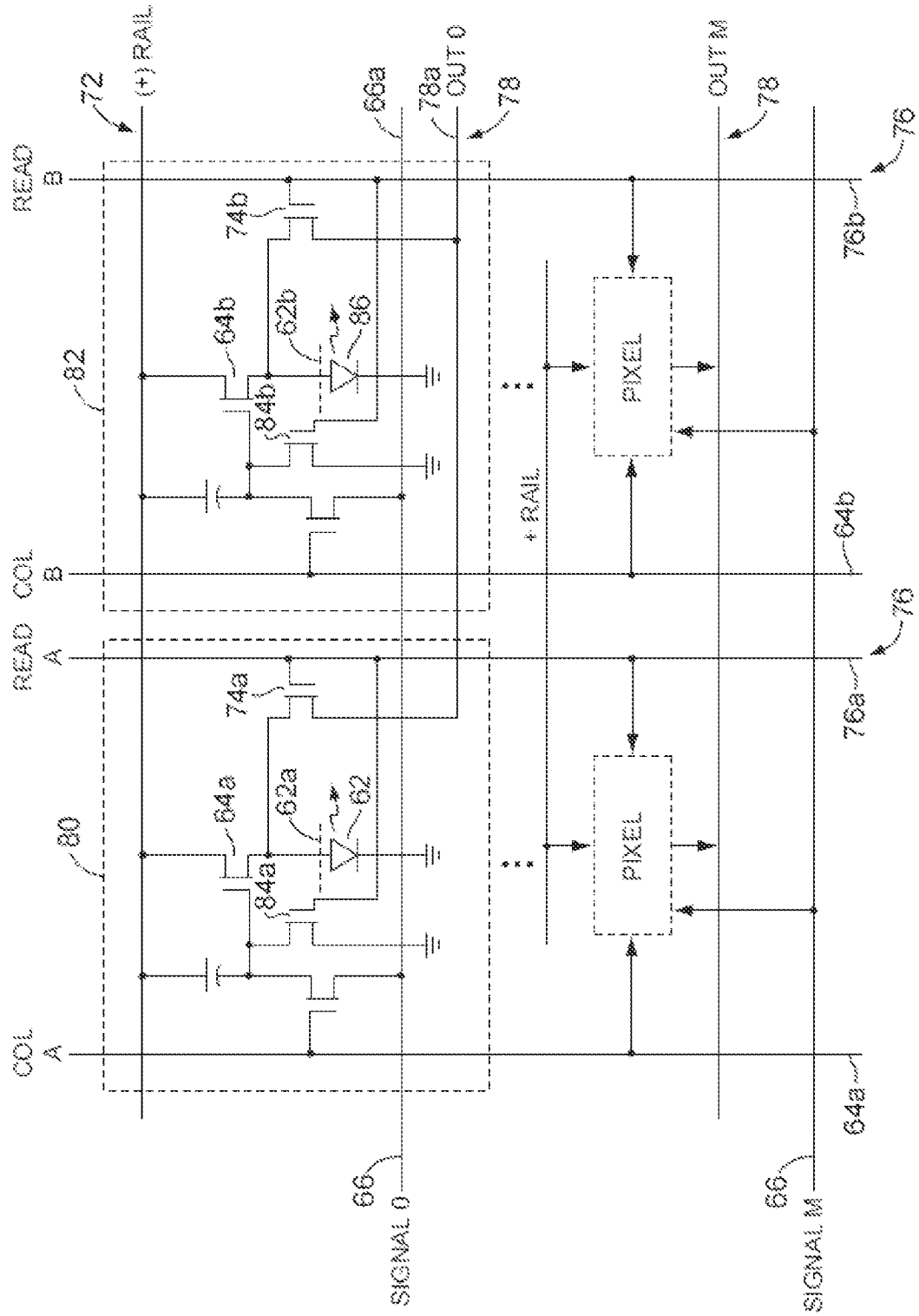
FIG. 7 shows a preferred form of the invention as applied to emissive displays.
Figure 8:
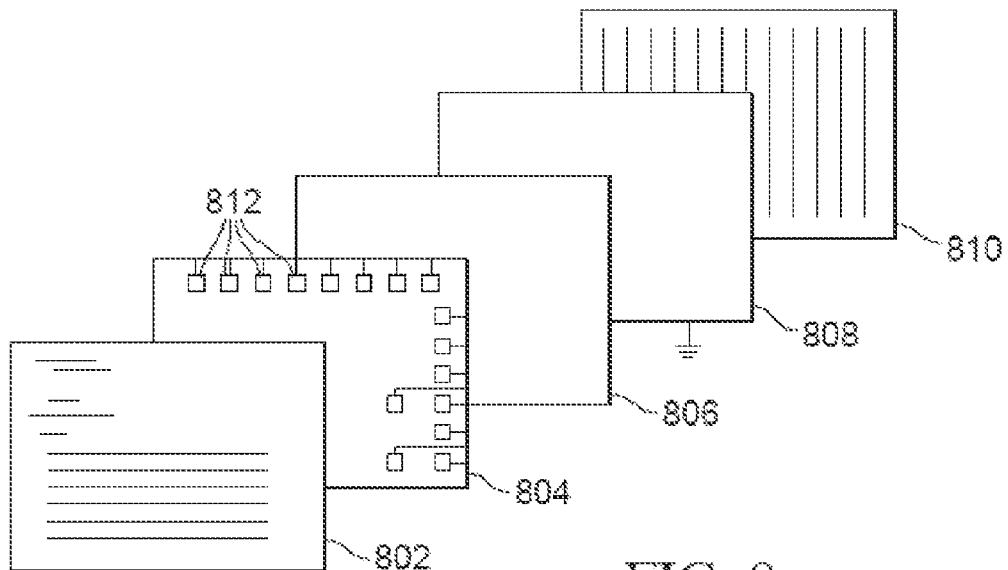
FIG. 8 shows a form of passive matrix array typically used for LCD, electronic paper, etc.
Figure 9:
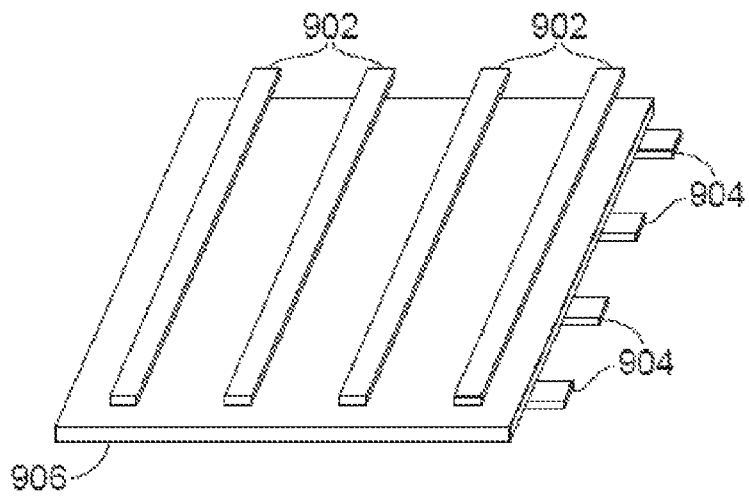
FIG. 9 shows a form of passive matrix array typically used for emissive technologies such as those based on OLED, PLED, etc.

In this embodiment of the invention, the plate 62*a* is configured in a manner to be accessible to the outside for observing changes in capacitive coupling between pixels caused by something in physical contact with the display surface. Again, this physical contact which increases the dielectric constant between pixel plates 62*a* of some of the various pixels beneath the contact area and, hence, the capacitance. Shown in FIG. 7 is a more detailed embodiment of a circuit applicable to this form of the invention. In FIG. 7, the addition of transistors 74 and 84, read enabled lines 76, and output lines 78 provide a path for observation of the anode plates of the LEDs. Thus, when pixel 80 is being refreshed, or at other appropriate times, a small AC signal is applied to signal line 66*a* (separately or superimposed on the DC value desired, as described above for LCD displays) while column select line 64*a* is enabled. Some of this AC signal will modulate the gate of 64*a* and be coupled thereby to the anode plate 62*a* of the LED. If a finger, for example, is in contact with the screen at this location, some of the AC signal will be coupled to adjacent anode plates (e.g., 62*b* here). Next, read select line 76*b* is driven high to connect one of a neighboring anode plate (62*b* in pixel 82, in this example) to the output line 78*a* and at the same time decouple the LED 86 from the positive supply rail 72 by turning on transistor 84*b*. This will shunt the gate of transistor 64*b* to ground, thus turning it off. In this way, any small AC signal induced on the neighboring pixel's anode plate, beyond that expected when there is no contact with the screen, can be observed.

Turning off a next-to-be-refreshed neighboring pixel will cause no significant problem with display quality. Immediately after pixel 80 is refreshed, pixel 82 will be refreshed so that the effect on the displayed image caused by turning off pixel 82 to observe capacitive coupling from pixel 80 is minimized. Persistence of the eye will smooth the short turn-off time, and the turn-off of a neighboring pixel will occur at precisely the point that it is at its dimmest anyway, i.e., right before its normal refresh time. In any case, it is contemplated that transistor 84*b* may be omitted in some implementations resulting in no pixels being turned off during sensing. Since its purpose is to remove the DC component from the LED, its use is not strictly required. While the description above was with respect to two pixels for illustration purposes, it is preferred that the systems and methods be applied to columns of pixels at a time. Since an object in contact with the screen will probably span several pixels (both vertically and horizontally), if all pixels in a column are driven with the AC signal while all pixel anode plates are observed in the next neighboring column, there will be reinforcement of signal coupling making for better observations. Additionally, column-oriented use of the method makes the scan of the whole display faster.

To observe the capacitively induced AC component on the neighboring pixel's anode plate requires minor modification of the AC observer circuitry herein disclosed, and will be a simple matter for those skilled in the art from the above disclosure of the principles of operation of the invention as regards an emissive display and a detailed description of that process is omitted. It will be appreciated by those skilled in the art that there are many circuit designs that will make a pixel's anode plate selectively observable and also alternative ways of driving a pixel anode plate with a small AC signal. Accordingly, the embodiment shown here is merely exemplary for teaching the principles of the invention.

In many arrangements, active matrix arrays, as discussed above, typically have a common electrode for all pixels which is disposed on a separate panel or plate. This common electrode forms the corresponding common conductor plate for each of the pixel plates of an LCD, or the common cathode (or anode for some embodiments) for all the pixel LEDs of an emissive display such as OLED or PLED. For LCD displays, this common electrode is usually the closest to the surface of the display panel. Similarly, for so called "top emitting" OLED displays, the common electrode is also usually closest to the surface of the display panel, etc. This common electrode is typically held at a fixed potential (though for LCDs, for reasons described above, it may change potential from time to time.)

LCD display panels are noted for having relatively slow display response times (typically being around 10 msec). OLED display panels have better response times usually on the order of 10 microseconds or so. While it is current practice that the common electrode be held at a fixed potential (which may change potential from time to time as is known in the art), so as to provide one plate of fixed electrostatic potential (LCD) or a return path for currents (OLED), this need not be so. The "common" electrode can vary in potential relative to a fixed potential without affecting the image on the display if the frequency of variation is significantly higher than the response frequency of the display. For example, the common electrode may have an AC potential with zero mean value and which has a frequency on the order of 10 times the response frequency of the display pixels and still "act" as a common electrode at fixed DC potential with regard to the display pixels. This is because the pixels simply can not respond fast enough to the changes in potential on the common electrode. Thus, it appears to the pixels as though the common electrode is still at a fixed potential.

The pixel-observed potential of the common electrode will be the mean value of the high-frequency AC potential applied to the common electrode if the common electrode carries symmetric current flows (i.e., the same magnitude of current flow for the positive cycle as for the negative cycles). Otherwise, it will have a DC offset if current flows are asymmetric (the magnitude of current flow is different for the positive and negative half-cycles). This DC offset caused by asymmetric current flow from the high-frequency source is preferably nulled by applying a DC bias of equal magnitude but opposite in sign along with the AC signal. Alternatively, this offset can simply be accounted for when designing and operating the pixel, i.e., basically by level shifting the operating points of the pixels to account for this asymmetric current-induced offset According to another aspect of the invention, the common electrode may be used for sensing and locating touch contact on the display panel. For a given applied AC signal, the common electrode will have impedance. The impedance of this common electrode will vary over time (and across the electrode) as the image on the screen varies. This variation may be determined from knowledge of the displayed image and/or by frequent automatic calibration (i.e., frequent measurement of the panel's impedance). The change in impedance (due to display activity) will also be slow relative to the frequency of the AC signal. An object, such as a finger, placed in contact with the display will be capacitively coupled to this common electrode, thus affecting the impedance of the common electrode and the current that flows from the AC source. Systems and methods for detecting and locating impedance variations in a planar rectangular conductor are known in the art and can be readily adapted by those skilled in the art for use with this aspect of the invention. For examples of such techniques, see the following, each of which is incorporated herein by reference: U.S. Pat. No. 6,977,646; U.S. Pat. No. 6,977,646; U.S. Pat. No. 6,016,140; U.S. Pat. No. 5,751,276; U.S. Pat. No. 5,717,321; "Touch Screen Controller Tips," Osgood, Ong and Downs, Burr-Brown Application Bulletin. While some of these references address simple DC resistance touchpads, it is straightforward for those skilled in the art to adapt these systems and methods for use with AC impedance.

One typical technique is to drive the 4 corners (or sides) of the planar rectangular conductor with AC sources, and measure the current flowing from each into the conductor. The current flow in each direction of measurement when there is no contact with the display is known (i.e., from measurements), and when a conductive object comes in contact with the conductor (directly or capacitively), the measured current flows change as some of the current is coupled to the contacting device. From the measurements of the current flows from the sources, the location of the disruption is determined by comparing the ratios of the currents (similar to the techniques used for touch pad, touch screens, digitizers, or solving an impedance bridge equation, etc.). If the impedance of the common conductor with respect to the sources is known ahead of time to be changing when there is no touch contact with the display, the technique described can still be used, albeit with some numerical complication relative to a simple fixed-impedance planar conductor or structure. All that is required is frequent impedance measurements of the common electrode by the touch system or modeling of the impedance changes due to display interaction with the common electrode.

Thus, measuring AC currents or impedances from the corners (or sides) of the common electrode, wherein the AC frequency is significantly greater than the response frequency of the display panel, allows dual use of the common electrode. This dual use is that of being the common electrode for the pixels of the display and the impedance sensing element for use by touch sensing and position locating electronics.

In the previously described embodiment of the invention, it is assumed that the display electronics and the position sensing electronics typically have a large common mode interaction, due to sharing of power sources, grounds, etc. In yet another embodiment of the invention, the display electronics and position sensing electronics are electrically isolated from one another (except for sharing the common electrode structure) to greatly reduce common mode interaction. Electrically isolating power sources and subsystems from one another is known in the art. Also known are techniques for electrically isolating signals between subsystems where information must still be communicated from one subsystem to another (i.e., use of opto-isolators for example.)

In still another embodiment of the invention, the position sensing electronics apply differential AC signals to the common electrode for determining impedance/current flow rather than single ended signals as was contemplated in the previous embodiment. In this way, position sensing using impedance methods of an object capacitively coupled to the common electrode can proceed with minimal interaction with the display portion of the system, while the display also uses the common electrode as a fixed (fixed includes the aforementioned changes of polarity so as to not electrolyze the dielectric) reference value. It is also contemplated that, in some cases, it may be preferable to apply different frequencies of the AC signal, from time to time, or in different directions (alternately or concurrently) across the common electrode for determining impedances/currents. For example, providing an AC signal of a certain frequency in the X direction and applying an AC signal of a different frequency in the Y direction.

Figure 10A:
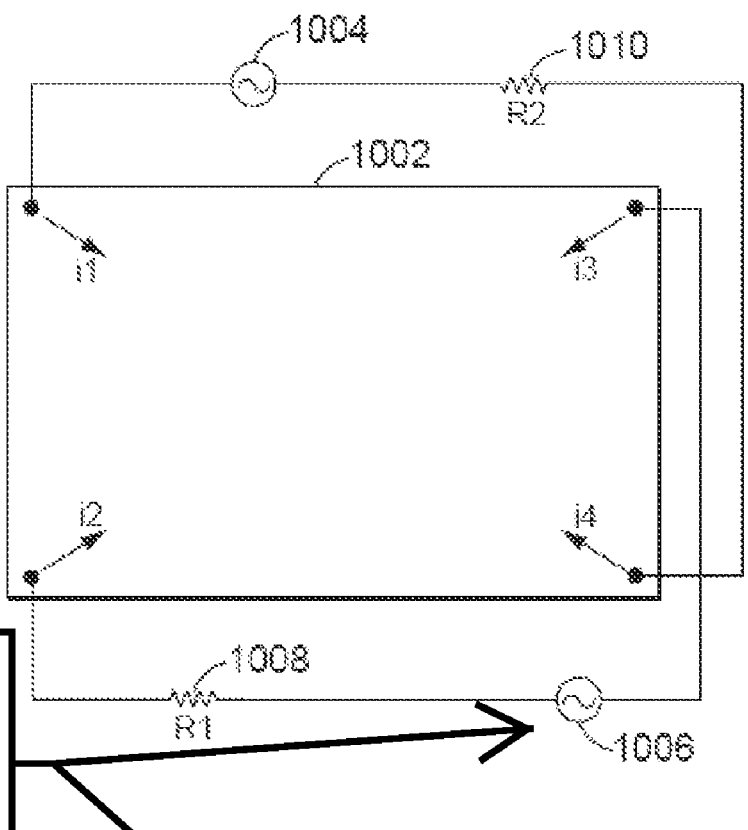
FIG. 10 depicts an example of AC sources coupled to the common electrode of an array of pixels under conditions of no touch contact and touch contact.

With reference to FIG. 10a, AC sources 1004 and 1006 are connected to the common electrode 1002 at the corners as shown through optional resistors 1008 and 1010. These resistors serve as current limiting devices and are not necessary in all implementation. Currents $i_1$, $i_2$, $i_3$, and $i_4$ flow into the common electrode from the sources. When there is no contact (i.e., no capacitive coupling to the common electrode), the currents $i_1$ and $i_4$ should be approximately equal and currents $i_2$ and $i_3$ should be approximately equal assuming a 1002 is symmetric.

Figure 10B:
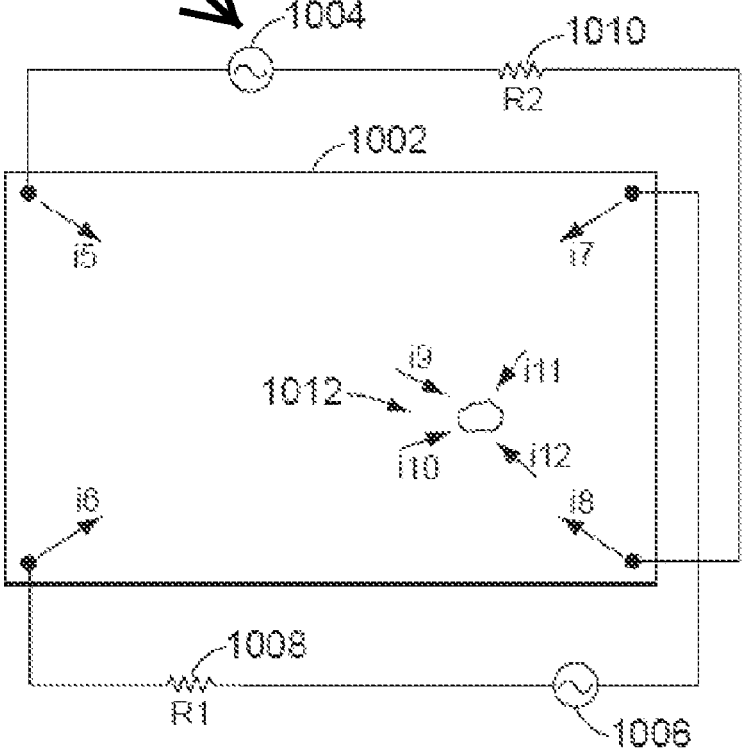

As will be seen in FIG. 10b, when an object 1012 capacitively couples (i.e., "contacts") to electrode 1002, the currents depicted in FIG. 10a will be disrupted. This is because the object in contact will "absorb" (shown as currents $i_9$, $i_{10}$, $i_{11}$, and $i_{12}$) some of the high frequency current from the AC sources 1004 and 1006. This is sensed by associated electronics (not shown) and registers a touch event. New currents $i_5$, $i_6$, $i_7$, and $i_8$ will flow from the sources (after some settling time) which are also sensed or observed. Knowing the impedance of 1002 at each source (without touch contact) and assuming it is linearly distributed across the planar surface (i.e., the plane has uniform impedance), and further knowing the current flowing from the sources, one can straightforwardly determine the location of current uptake from electrode 1002 (i.e., the area of capacitive coupling). For further information see "Electronics Engineers' Handbook," Fink, Editor-in-Chief, McGraw-Hill, 1975; "Electronics Engineers' Handbook," Christiansen, Jurgen and Fink, McGraw-Hill Professional, 1996, and "Field and Wave Electromagnetics," Chang, Prentice Hall, 1989, all of which are incorporated herein by reference. It is important to note that while FIGS. 10a and 10b show differential AC sources, single ended AC sources are also contemplated for use as described earlier. Furthermore, the AC sources need not be of the same frequency also as described earlier.

It is often desirable to make the common electrode as low in impedance as possible with regard to the pixels circuits. However, while signals may have rapid rise and fall times, and the low impedance of the common electrode may help to minimize noise in the display, it is contemplated, that when using the common electrode for touch position sensing, it may be desirable to raise its impedance in some cases. One contemplated method of so doing is to perforate the common electrode with numerous voids or holes. In this way, the impedance of the common electrode is still relatively low for use by the display but is much higher for the high frequency AC signals applied to it for determining touch contact and the location thereof.

Having fully disclosed the various aspects of the invention and some of its exemplary embodiments, methods and applications, those skilled in the art will undoubtedly expand its application and devise other embodiments while still being within the scope and spirit of the invention as recited in the following claims.

The invention claimed is:

1. A method of determining the approximate location of contact on a display, the display having a display surface and a plurality of pixels at defined pixel locations, each pixel location including a pixel plate capacitor, each pixel plate capacitor requiring a periodic refresh of the charge stored on the capacitor and each pixel plate capacitor configured to be selectively coupled to a stabilizing capacitor, comprising:

(i) prior to refreshing the charge on a monitored pixel plate capacitor, decoupling a stabilizing capacitor from a monitored pixel plate capacitor and discharging at least the monitored pixel plate capacitor;

(ii) applying a driving AC signal to the monitored pixel plate capacitor of the display, and the monitored pixel plate capacitor exhibiting a detectable capacitance;

(iii) electrically monitoring an aspect of the applied AC component;

(iv) performing AC analysis using the monitored AC component of the applied driving signal to determine a signal proportional to the pixel plate capacitance;

(v) comparing the signal proportional to the determined pixel plate capacitance to a predetermined value;

(vi) identifying the approximate location in the display of the monitored pixel having a pixel plate capacitance above the predetermined value; and (vii) subsequent to monitoring an aspect of the applied AC component, coupling the stabilizing capacitor to the monitored pixel plate capacitor and refreshing the charge on the monitored pixel plate capacitor to that necessary to display the desired intensity by applying a DC voltage to the monitored pixel.

2. The method of claim 1 wherein the aspect of the applied AC component comprises the magnitude of the voltage of the AC component.

3. The method of claim 1 wherein the aspect of the applied AC component comprises the magnitude of the current of the AC component.

4. The method of claim 1 wherein the display is an LCD display.

5. The method of claim 1 wherein the display is an OLED display.

6. The method of claim 1 wherein the display comprises a linear display.

7. The method of claim 1 wherein the display comprises a two-dimensional display.

8. The method of claim 1 wherein the AC analysis comprises determining the AC impedance of the pixel plate capacitor.

9. The method of claim 1 wherein the AC analysis comprises determining the phase of the current relative to the voltage of the applied AC component.

10. The method of claim 1 wherein the driving AC signal is driven onto the pixel plate capacitor by the same driver used to refresh the pixel.

11. A method of determining the approximate location of contact on a display having first and second pixel location and associated pixel capacitors, wherein the first and second pixel plate capacitors are not electrically connected to the same driving signal, the first and second pixel plate capacitors requiring a periodic refresh of their stored charge, comprising:

(i) prior to refreshing the charge on the second pixel plate capacitor, decoupling a stabilizing capacitor from the second pixel plate capacitor and discharging at least the second pixel plate capacitor;

(ii) applying a voltage to a first pixel capacitor of the display, the applied voltage having an AC component;

(iii) electrically measuring an aspect of the applied AC component at the second pixel plate capacitor, the measured aspect being capacitively coupled from the first pixel plate capacitor to the second pixel plate capacitor through an object in touch contact with the display;

(iv) comparing the measured aspect of the applied AC component at the second pixel plate capacitor to a predetermined value;

(v) indicating that there is an object in contact with the surface of the display at the first or second pixel location when the measured aspect of the applied AC component is above the predetermined value; and (vi) subsequent to electrically measuring an aspect of the applied AC component, coupling the stabilizing capacitor to the second pixel plate capacitor and refreshing the charge on the second pixel plate capacitor to that necessary to display the desired intensity by applying a DC voltage to the second pixel.

12. The method of claim 11 wherein the measured aspect comprises at least a current value and a voltage value.

* * * * *